(12) United States Patent
Szeteli

(10) Patent No.: US 9,580,197 B2
(45) Date of Patent: Feb. 28, 2017

(54) REMOVAL SYSTEM

(71) Applicant: as Strömungstechnik GmbH, Ostfildern (DE)

(72) Inventor: Andreas Szeteli, Ostfildern (DE)

(73) Assignee: as Strömungstechnik GmbH, Ostfildern (DE)

( * ) Notice: Subject to any disclaimer, the term of this patent is extended or adjusted under 35 U.S.C. 154(b) by 55 days.

(21) Appl. No.: 14/484,326

(22) Filed: Sep. 12, 2014

(65) Prior Publication Data

US 2015/0068623 A1  Mar. 12, 2015

(30) Foreign Application Priority Data

Sep. 12, 2013  (DE) ........................ 10 2013 110 020

(51) Int. Cl.
| | | |
|---|---|---|
| *B67D 1/00* | (2006.01) | |
| *B65B 69/00* | (2006.01) | |
| *F16L 15/08* | (2006.01) | |
| *F16L 55/00* | (2006.01) | |
| *B67D 3/00* | (2006.01) | |
| *B67D 7/34* | (2010.01) | |

(52) U.S. Cl.
CPC ........ *B65B 69/0075* (2013.01); *B67D 3/0064* (2013.01); *B67D 3/0074* (2013.01); *B67D 7/344* (2013.01); *F16L 15/08* (2013.01); *F16L 55/00* (2013.01); *Y10T 137/8158* (2015.04); *Y10T 137/9029* (2015.04)

(58) Field of Classification Search
CPC .... B67D 3/0067; B67D 3/0074; B67D 7/344; B65B 69/0075; F16L 15/08; F16L 55/00; Y10T 137/9029; Y10T 137/8185

USPC ......... 222/52, 53, 61–63, 75, 464.1, 153.13, 222/153.14; 137/553–556, 798; 285/93
See application file for complete search history.

(56) References Cited

U.S. PATENT DOCUMENTS

| | | | | |
|---|---|---|---|---|
| 6,079,597 | A | * | 6/2000 | Rauworth ................ B65D 1/20 137/212 |
| 6,206,240 | B1 | | 3/2001 | Osgar |
| 6,357,494 | B1 | * | 3/2002 | Hahn .................... B67D 1/0802 141/367 |
| 6,425,502 | B1 | * | 7/2002 | Rauworth ................ B65D 1/20 137/212 |
| 6,568,427 | B2 | * | 5/2003 | Imai ..................... B67D 7/0283 137/590 |
| 6,634,396 | B2 | * | 10/2003 | Ozawa ................. B67D 1/0835 137/588 |
| 6,879,876 | B2 | * | 4/2005 | O'Dougherty ....... B67D 7/0283 700/231 |
| 8,381,768 | B2 | * | 2/2013 | Hasegawa ............ B67D 7/0261 137/212 |
| 9,126,749 | B2 | * | 9/2015 | Hodges .................. B65D 23/02 |
| 2006/0283932 | A1 | | 12/2006 | Asp |
| 2012/0256756 | A1 | | 10/2012 | Johnson |

* cited by examiner

*Primary Examiner* — Lien Ngo
(74) *Attorney, Agent, or Firm* — Michael Soderman

(57) ABSTRACT

The invention relates to a removal system for a portable container and comprises an immersion pipe that is mounted in a bung unit that is held in an opening of the container. Furthermore, the removal system includes an extraction head that can be fastened to the immersion pipe. A switch that generates a switching signal whose switching states indicate whether the extraction head is fastened in a target position on the immersion pipe or not is provided in or on the extraction head.

10 Claims, 3 Drawing Sheets

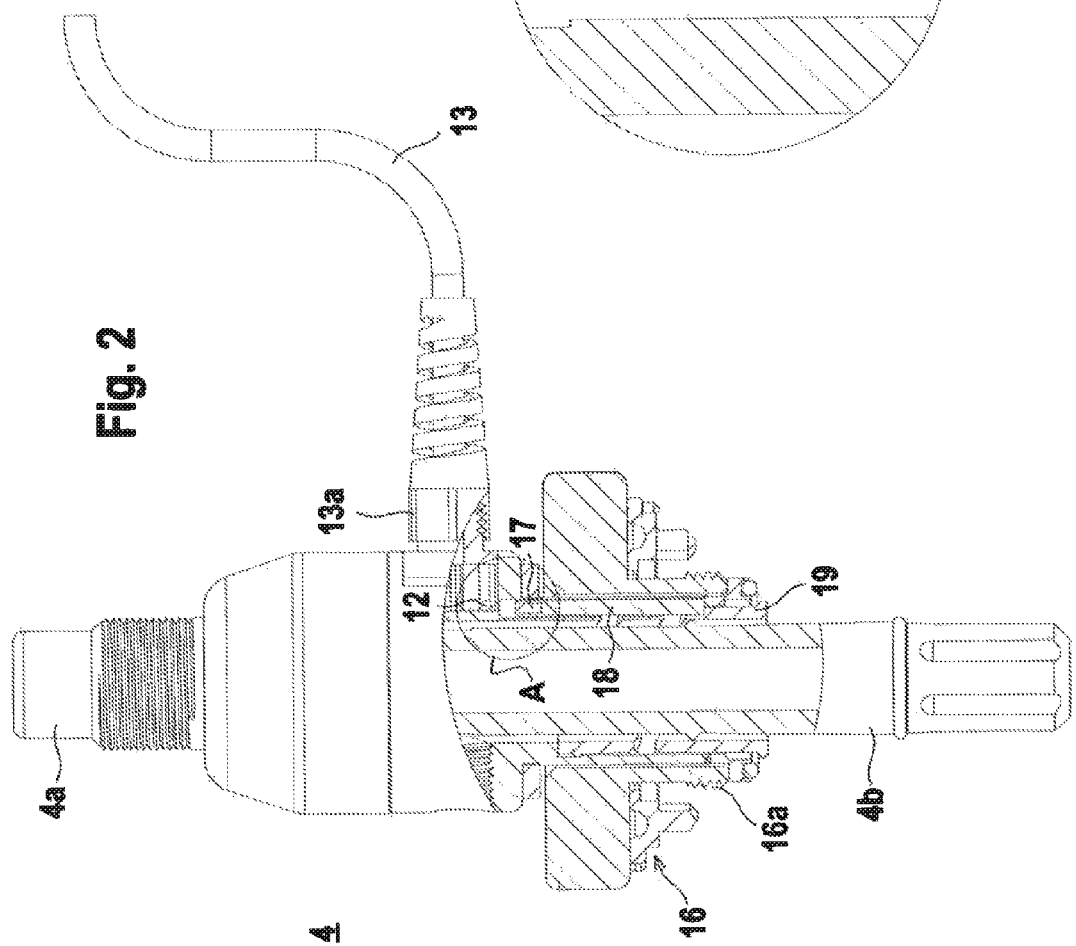

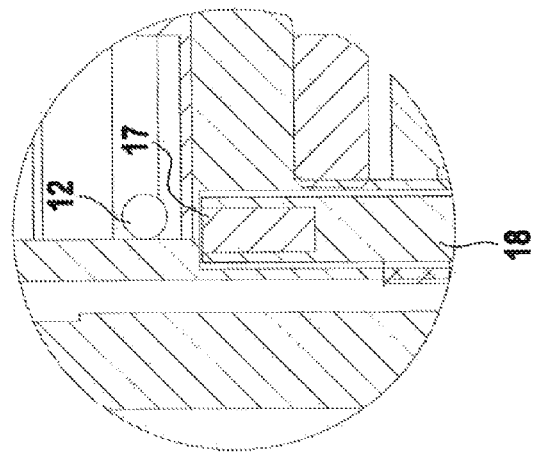
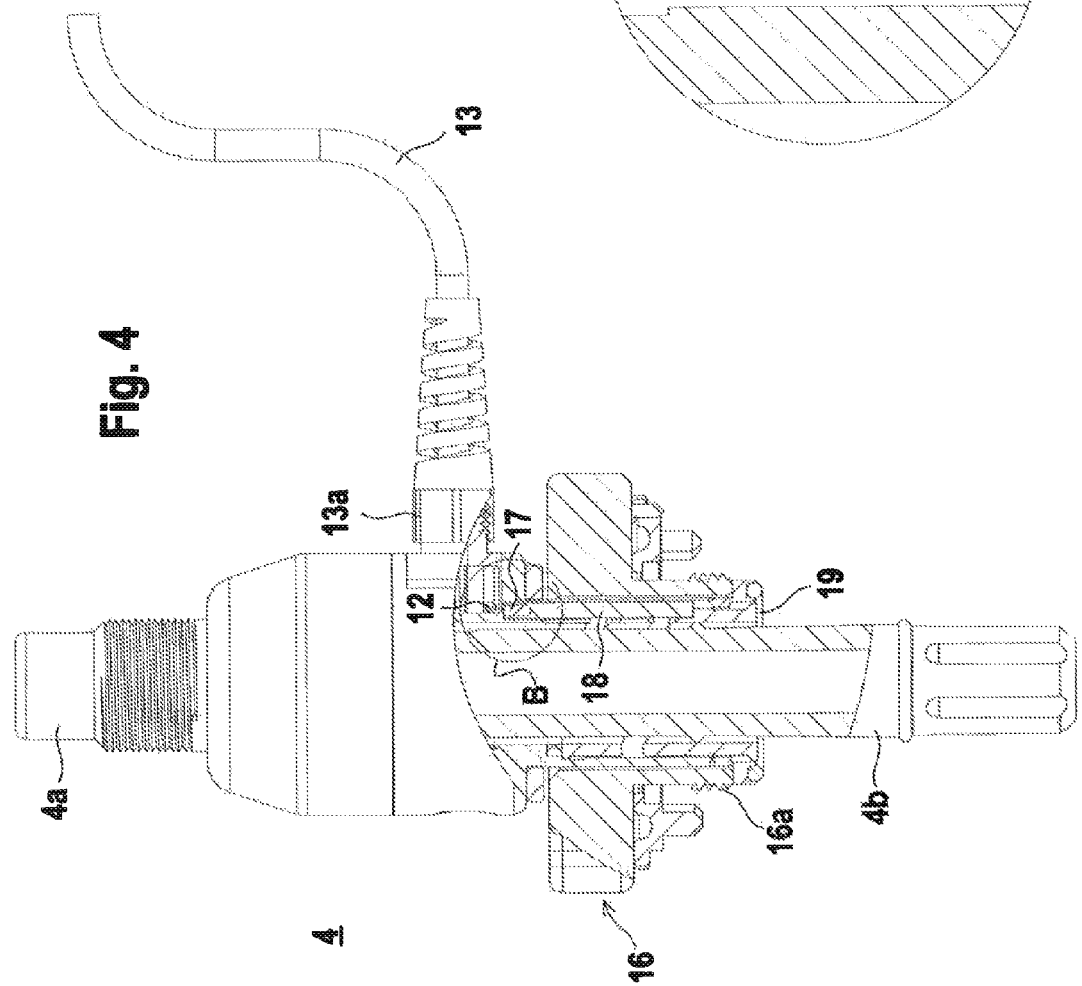

REMOVAL SYSTEM

CROSS-REFERENCE TO RELATED APPLICATIONS

This application claims the benefit under 35 USC 119 of German Application No. DE 10 2013 110 020.1 filed on Sep. 12, 2013; this application is incorporated by reference herein in its entirety.

BACKGROUND OF THE INVENTION

The invention relates to a removal system in accordance with the preamble of claim 1.

A removal system of that type is known from EP 0 977 702 B1. This removal system serves to fill and empty containers, especially barrels, that are filled with liquid chemicals. The removal system is comprised of a container closure. This container closure is generally inserted into a container opening seating a bung head. The container closure itself has an immersion pipe, capable of being connected to the bung head, via which liquids stored in the container can be removed and via which liquids can be fed into the container. Furthermore, the container closure has an extraction connector element that is typically designed in the form of an extraction head and that can be connected to the bung head.

A fluid is then removed from the container via the extraction connector element or, if applicable, a fluid is also fed in. A pump is connected via the extraction connector element here to carry out the removal or supply of a fluid.

The liquids stored in the containers typically involve special liquid chemicals.

A high level of purity is required, for one thing, for these special chemicals, meaning that contaminants have to be kept away from these chemicals. Moreover, these special chemicals could involve hazardous substances, so an uncontrolled leak of a fluid has to be avoided for that reason alone.

SUMMARY OF THE INVENTION

The invention relates to a removal system for a portable container (3) and comprises an immersion pipe (5) that is mounted in a bung unit that is held in an opening of the container (3). Furthermore, the removal system includes an extraction head that can be fastened to the immersion pipe (5). A switch (12) that generates a switching signal whose switching states indicate whether the extraction head is fastened in a target position on the immersion pipe (5) or not is provided in or on the extraction head.

DETAILED DESCRIPTION

Taking that as a starting point, the invention is based on the problem of providing a removal system that makes a reliable and danger-free removal of liquids possible from the container.

The elements of claim 1 are specified to solve this problem. Advantageous embodiments and useful design developments of the invention are described in the subclaims.

The invention relates to a removal system for a portable container with an immersion pipe that is mounted in a bung unit that is held in an opening of the container. Furthermore, the removal system includes an extraction head that can be fastened to the immersion pipe. A switch that generates a switching signal whose switching states indicate whether the extraction head is fastened in a target position on the immersion pipe or not is provided in or on the extraction head.

The basic idea of the invention is consequently that an automatic check is done with the aid of the switching signal generated in the switch as to whether the extraction head is correctly fastened to the immersion pipe or not. An uncontrolled leak of a fluid from the container can therefore be avoided, because possible leaks between the extraction head and the immersion pipe as a result of inadequate fastening between these units are recognized with the switch and countermeasures can therefore be promptly initiated.

The check of the fastening status between the extraction unit and the immersion pipe by means of the switch as per the invention can be applied in general to different types of fastening means.

It is especially advantageous when the extraction head is fixed in place on the immersion pipe via screw connections, and the switch is only actuated when the extraction head is correctly screwed together with the immersion pipe.

It is also advantageous when the extraction head of the removal system as per the invention constitutes an extraction and filling head, i.e. a fluid can be removed from the container via the extraction head and a fluid can be poured back into it.

In accordance with an advantageous design form of the invention, the switching signal of the switch is read into a control unit and the removal or filling of the container is enabled or blocked by means of the control unit in dependence upon this switching signal.

The control unit actuates a pump in an appropriate fashion; a fluid can be removed from the container or poured into it, as the case may be, via the pump. The operation of the pump will only be enabled via the control unit when a fault-free fastening of the extraction head to the immersion pipe is reported with the switching signal of the switch.

A safety function for the removal system as per the invention that operates in a fully automated fashion is realized in this way.

The functionality of this safety system can be expanded even further by feeding the switching signal of the switch into a warning signal generator that issues a warning signal when the switch is not actuated.

Faulty conditions in the fastening between the extraction head and the immersion pipe will be displayed for the users of the removal system because of that, so the respective user can immediately apply countermeasures. The warning signal generator can constitute a horn, for instance, that emits an acoustic warning signal. Alternatively, the warning signal generator can constitute a lamp that emits an optical warning signal.

It is especially advantageous when the extraction head is fastened to the immersion pipe by means of a robot.

The fastening process that is automatically carried out by the robot is possible because the fastening status of the extraction head on the immersion pipe can be checked with the switching signal of the switch, so the robot can therefore carry out the fastening process in dependence upon this switching signal.

In accordance with an advantageous design form of the invention, the switch is a reed switch or a capacitive or inductive sensor.

The switch can be actuated by means of an actuation element in general in these design forms; the position of the actuation element is dependent upon the fastening status of the extraction head on the immersion pipe.

It is advantageous for the switch to be actuated when the extraction unit is not fastened to the immersion pipe in the target position, otherwise the switch is not actuated.

The switch is consequently designed to be a normally closed contact.

The fastening element is generally comprised of an electrically conductive material or a magnet. The fastening element does not operate in a mechanical contact fashion, but instead without physical contact, such that the fastening element actuates the switch without contact via a magnetic or electric field when it is in the range of influence right in front of the switch.

Systems of switches of that type with associated fastening elements have a simple and robust structure.

It is especially advantageous when the actuation element is adjustable with regard to its position by means of a spring that is mounted between the extraction unit and the immersion pipe.

The movement between the extraction unit and the immersion pipe that is required to bring about the fastening between these elements is converted into a movement of the fastening element with the spring in a simple way in terms of the design. In so doing, the conversion by means of the spring is carried out in such a way that the fastening element goes through a defined switching path between the actuation position and non-actuation of the switch.

In accordance with an advantageous design form of the invention, the switch and its associated components are encapsulated in the container vis-a-vis the fluid.

Interference with or damage to the switch and the components associated with it from the fluid in the container is ruled out because of that.

In principle, the extraction unit, the immersion pipe and the associated fasteners can be comprised of metallic materials. It is especially advantageous, however, when these components are comprised of chemically resistant plastics, so there is no risk that the fluid in the container could corrode and damage these components.

In accordance with an advantageous design form, the switching signal of the switch causes an optical signal generator integrated into the extraction head to light up when the switch is actuated.

The signal generator is preferably a light-emitting diode. The user is immediately signaled in a recognizable way by the signal generator as to whether the extraction head is correctly fastened to the immersion pipe.

BRIEF DESCRIPTION OF THE DRAWINGS

The invention will be explained with the aid of the drawings below. The following are shown in the figures:

FIG. 2: Diagram of the extraction head of the removal system in accordance with FIG. 1 with an actuated switch.

FIG. 3: Enlarged detail of the arrangement of FIG. 2.

FIG. 4: Diagram of the extraction head of the removal system in accordance with FIG. 1 with an actuated switch.

FIG. 5: Enlarged detail of the arrangement of FIG. 4.

DETAILED DESCRIPTION OF THE PREFERRED EMBODIMENTS

Figure 1:
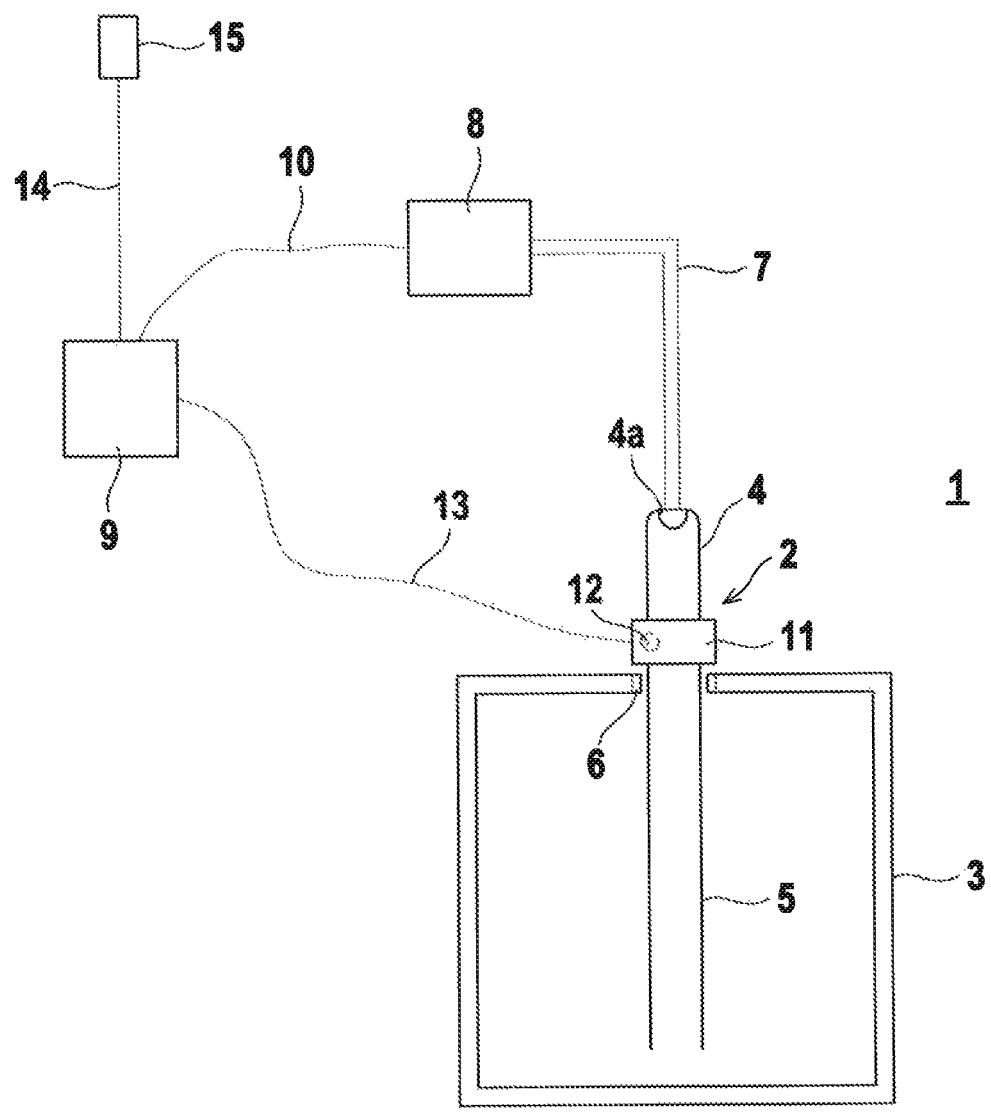
FIG. 1: Schematic diagram of the removal system as per the invention.

FIG. 1 shows a schematic diagram of a first example of the removal system 1 as per the invention. The removal system 1 is comprised of a container closure 2 for a portable container 3 that constitutes, in particular, a barrel or the like.

A fluid is stored in the container 3. Fluids stored in containers 3 of that type especially involve special liquid chemicals.

The container closure 2 is comprised of an extraction head 4 and an immersion pipe 5. The immersion pipe 5 is mounted in a bung head 6 that is seated in an opening of the container 3 and is therefore firmly connected to the container 3. The components of the container closure 2 are comprised of chemically resistant plastics, so they will not be corroded by the special chemicals stored in the container 3. The container closure 2 usually also serves as a closure of the container 3 during its transport.

The extraction head 4 serves to remove fluids from the container 3. The extraction head 4 has a fluid connection 4a at its upper end for that. A line 7 that leads to a pump 8 is connected to this fluid connection 4a.

The pump 8 is controlled by a control unit 9. The pump 8 is connected to the control unit 9 via a cable 10 for this.

The extraction unit 4 is fastened to the immersion pipe 5 via fasteners 11. The fasteners 11 can be actuated by means of a robot. In the case at hand, the extraction unit 4 is screwed onto the immersion pipe 5. An automatic check is done by means of a switch 12 as to whether the extraction unit 4 is fastened correctly and in a target position on the immersion pipe 5. The switching signal generated in the switch 12 is read into the control unit 9; the switch 12 is connected via a cable 13 to the control unit 9 for this. The control unit 9 controls the pump 8 in dependence upon the switching signal generated by the switch 12. In the process, the operation of the pump 8 will only be enabled by the control unit 9 if the switch 12 reports a fault-free fastening of the extraction unit 4 to the immersion pipe 5. Hazardous conditions involving a situation in which fluid is removed from the container 3 or fluid is supplied to it when there is a faulty fastening of the extraction unit 4, and fluid possibly leaks out in the process in the area of fasteners 11 that have not completely closed, are therefore avoided.

Finally, a warning signal 15 is connected to the control unit 9 via a further cable 14. This emits a warning signal 15 when faulty fastening is reported with the switching signal of the switch 12. A horn or a lamp can be provided as a warning signal generator 15.

FIG. 2 shows the extraction unit 4 of the removal system 1 in a separate diagram; the switch 12 is shown in a non-actuated state. FIG. 3 shows the details designated as A in FIG. 2 in an enlarged presentation.

FIG. 4 shows the extraction unit 4 of the removal system 1, likewise in a separate diagram; the switch 12 is actuated here. FIG. 5 shows the details designated as B in FIG. 4 in an enlarged presentation.

As FIGS. 2 and 4 show, the fluid connection 4a of the extraction unit 4 is provided at its upper end. A tubular connection 4b that can be inserted into the immersion pipe 5 is provided at the lower end of the extraction unit 4. A clamping nut 16 is provided as a fastener 11 for fastening the extraction unit 4 to the immersion pipe 5. It has a central hole running in the axial direction in which the tubular connection 4b of the extraction unit 4 runs. The clamping nut 16 has an outer thread 16a that is screwed into a thread in the immersion pipe 5 that is not shown to realize the screw connection of the extraction head 4 to the immersion pipe 5.

A check is done by means of the switch 12 as to whether the screw connection between the extraction unit 4 and the immersion pipe 5 is correct. The switch 12 is arranged above the clamping nut 16 in the housing of the extraction unit 4 for this. The switch 12 is encapsulated vis-a-vis the fluid in the container 3, so it cannot make direct contact with it.

The switch 12 can generally be comprised of a sensor, for instance a capacitive or inductive sensor. In the case at hand, the switch 12 is designed to be a reed switch. The switch 12 is electrically connected to the cable 13 that is mounted with a cable connector 13a to the housing of the extraction unit 4.

The reed switch can be actuated by means of a fastening element 17 in the form of a magnet. The actuation takes place without physical contact to the effect that two contacts of the reed switch close, meaning that the switch 12 is closed, when the reed switch is in the area of the magnetic field of the fastening element 17. If the fastening element 17 is far away from the switch 12, the switch 12 is not actuated, as shown in FIGS. 2 and 3.

The fastening element 17 is comprised of a plate-shaped magnet that is mounted on a rod-shaped guide element 18. The longitudinal axis of the guide element 18 runs in a vertical direction. The guide element 18 is mounted in a movable fashion along this longitudinal axis.

The guide element 18 with the fastening element 17 is coupled to a spring 19 that is mounted between the clamping nut 16 and the tubular connection 4b of the extraction unit 4.

FIGS. 2 and 3 show the case when the clamping nut 16 is not correctly screwed onto the immersion pipe 5 and there is consequently not a fault-free connection between the extraction unit 4 and the immersion pipe 5. The spring is pressed down because the clamping nut 16 is being screwed into the immersion pipe 5, and the guide element 18 is consequently pulled downwards, meaning that the fastening element 17 that is mounted on the guide element 18 is pulled away from the switch 12. The fastening element is consequently located outside of the sphere of influence of the switch 12, so it is open, meaning not actuated.

FIGS. 4 and 5 show the case when the clamping nut 16 is correctly screwed onto the immersion pipe 5 or is not screwed onto it at all. In that case, the spring is not pulled downwards by the clamping nut 16, so the guide element 18 is also not pulled downwards. The fastening element 17 is therefore within the sphere of influence of the switch 12; it is actuated because of that, meaning closed.

A precise distinction is consequently made with the switching states that are formed in this way as to whether the extraction unit 4 is fastened to the immersion pipe 5 in a proper and fault-free way or not. The switching signal of the switch 12 is read into the control unit 9 via the cable 13 so that the control unit 9 can carry out the control operations that were explained with regard to FIG. 1.

LIST OF REFERENCE NUMERALS (1) Removal system
(2) Container closure
(3) Container
(4) Extraction unit
(4a) Fluid connection
(4b) Connection
(5) Immersion pipe
(6) Bung head
(7) Line
(8) Pump
(9) Control unit
(10) Cable
(11) Fasteners
(12) Switch
(13) Cable
(13a) Cable connector
(14) Cable
(15) Warning signal generator
(16) Clamping nut
(16a) Outer thread
(17) Fastening element
(18) Guide element

The invention claimed is:

1. A removal system for a portable container with an immersion pipe mounted in a bung unit that is held in an opening of the container and with an extraction head that can be fastened to the immersion pipe, characterized in that a switch, which generates a switching signal whose switching states indicate whether the extraction head is fastened to the immersion pipe in a target position or not, is provided in or on the extraction head, wherein the switching signal of the switch is read into a control unit, and the removal or filling of the container is enabled or blocked via the control unit in dependence upon this switching signal, and wherein the extraction head is fixed in place via screw connections to the immersion pipe and the switch is only actuated when the extraction head is correctly screwed to the immersion pipe.

2. The removal system according to claim 1, characterized in that a fluid can be removed from the container via the extraction head and poured back into it.

3. The removal system according to claim 1, characterized in that the switching signal of the switch is fed into a warning signal generator, which generates a warning signal when the switch is not actuated.

4. Removal system according to claim 1, characterized in that the switch can be actuated via an actuation element, wherein the position of the actuation element is dependent upon the fastening status of the extraction head on the immersion pipe.

5. Removal system according to claim 4, characterized in that the switch is actuated when an extraction unit is not fastened to the immersion pipe in the target position and that the switch is not otherwise actuated.

6. The removal system according to claim 4, characterized in that the position of the actuation element is adjustable via a spring that is mounted between the extraction unit and the immersion pipe.

7. The removal system according to claim 1, characterized in that the switch is a reed switch or a capacitive or inductive sensor.

8. The removal system according to claim 1, characterized in that the switch and its associated components are encapsulated vis-a-vis the fluid in the container.

9. The removal system according to claim 1, characterized in that its components are made of chemically resistant plastics.

10. The removal system according to claim 1, characterized in that the switching signal of the switch causes an optical signal generator integrated into the extraction head to light up when the switch is actuated.

* * * * *